(12) United States Patent
Heidari et al.

(10) Patent No.: US 8,233,570 B2
(45) Date of Patent: Jul. 31, 2012

(54) ADAPTIVE CHANNEL PREDICTION SYSTEM AND METHOD

(75) Inventors: Abdorreza Heidari, Kitchener (CA); Amir Keyvan Khandani, Kitchener (CA); Derek McAvoy, Toronto (CA)

(73) Assignees: BCE Inc., Montreal, Quebec (CA); University of Waterloo, Waterloo, Ontario (CA)

( * ) Notice: Subject to any disclaimer, the term of this patent is extended or adjusted under 35 U.S.C. 154(b) by 1434 days.

(21) Appl. No.: 11/694,474

(22) Filed: Mar. 30, 2007

(65) Prior Publication Data

US 2008/0240260 A1      Oct. 2, 2008

(30) Foreign Application Priority Data

Dec. 18, 2006    (CA) ..................................... 2571385

(51) Int. Cl.
  *H04L 27/06* (2006.01)
  *H04B 1/10* (2006.01)
(52) U.S. Cl. ........................ 375/340; 375/350
(58) Field of Classification Search .................. 375/148, 375/260, 316, 324, 340, 377, 346, 350, 229, 375/230, 231–234; 370/252
See application file for complete search history.

(56) References Cited

U.S. PATENT DOCUMENTS

| | | | |
|---|---|---|---|
| 6,505,053 B1 | 1/2003 | Winters et al. | |
| 6,570,910 B1 * | 5/2003 | Bottomley et al. | 375/148 |
| 6,658,261 B1 | 12/2003 | Winters et al. | |
| 7,206,290 B2 * | 4/2007 | Qi et al. | 370/252 |
| 7,376,210 B2 * | 5/2008 | Kim et al. | 375/350 |
| 7,379,513 B2 * | 5/2008 | Wang et al. | 375/340 |
| 2002/0172269 A1 * | 11/2002 | Xu | 375/211 |
| 2003/0053523 A1 * | 3/2003 | Xu | 375/147 |
| 2006/0062284 A1 * | 3/2006 | Li et al. | 375/148 |
| 2007/0211747 A1 * | 9/2007 | Kim | 370/437 |
| 2008/0205555 A1 * | 8/2008 | Zhu et al. | 375/340 |

OTHER PUBLICATIONS

Janapsatya, J. et al., An Investigation Into Channel Prediction Algorithms for a Switched-Beam Smart Antenna System, May 17-19, 2004, Microwaves, Radar and Wireless Communications, 2004. MIKON-2004. 15th International Conference on, vol. 2, pp. 641-644.*
Pop, M.F., Limitations of Sum-of-Sinusoidal Fading Channel Simulators, 2001, Communications, IEEE Transactions on, pp. 699-708.*
Heidari, A., Adaptive Modeling, Prediction, and Tracking of Wireless Fading Channels, Jan. 2007, Department of Electrical & Computer Engineering, University of Waterloo, Technical Report UW-E&CE #2007-01, Jan. 2007,pp. 1-29.*

(Continued)

*Primary Examiner* — Lawrence B Williams
(74) *Attorney, Agent, or Firm* — Alexander Anishchenko; Borden Ladner Gervais LLP

(57) ABSTRACT

A method and system for predicting channel fading, particularly in a mobile wireless environment, that is accurate for long-range predictions. The method comprises estimating a model parameters based on a current channel estimate, and recursively adapting the model parameters to predict future channel fading coefficients until a predetermined re-acquisition condition is satisfied. Once the re-acquisition condition has been satisfied, the model parameters are again estimated based on a current channel estimate. The acquired model parameters are adaptively updated and used in a Kalman filter.

42 Claims, 5 Drawing Sheets

OTHER PUBLICATIONS

Heidari et al., Adaptive Long-Range Prediction of Mobile Fading, 2006, Communications, 2006 23rd Biennial Symposium on, pp. 219-222.*

Guowen et al., Advanced K-Step forward Prediction Algorithm in Wireless Channel, 2004, Communications, Circuits and Systems, 2004. ICCCAS 2004. 2004 International Conference on, vol. 1, pp. 277-281.*

Heidari et al., Adaptive Modeling and Long-Range Prediaciton of Mobile Fading Channels, 2010, Communications, IET, vol. 4, Issue: 1, pp. 39-50.*

Schafhuber et al., MMSE and Adaptive Prediction of Time-Varying Channels for OFDM Systems, 2005, Wireless Communications, IEEE Transactions on, vol. 4, Issue: 2, pp. 593-602.*

* cited by examiner

US 8,233,570 B2

ADAPTIVE CHANNEL PREDICTION SYSTEM AND METHOD

PRIORITY

This patent application claims priority to Canadian Patent Application No. 2,571,385, filed on Dec. 18, 2006, titled "ADAPTIVE CHANNEL PREDICTION SYSTEM AND METHOD".

FIELD OF THE INVENTION

The present invention relates generally to channel estimation in wireless communications systems. More particularly, the present invention relates to adaptive channel prediction in wireless networks subject to fading.

BACKGROUND OF THE INVENTION

In wireless communication systems, a received signal experiences significant power fluctuations due to fading. Signal fading is caused by multipath propagation and Doppler frequency shift. Multiple scatterers cause interference between reflected transmitter signal components. As a mobile receiver moves through the interference pattern set up by the multiple scatterers, it experiences a specific fading pattern, which is unique to the mobile path and the scattering environment, and is usually time-varying. The superposition of scattered component waves can lead to constructive and destructive interference, which create fading peaks and deep fades, respectively.

Channel fading prediction can be used to improve the performance of communication systems. Having estimates of future channel characteristics can facilitate and enhance the performance of many tasks of the receiver and the transmitter, such as channel equalization, data symbol decoding, antenna beamforming, and adaptive modulation.

To predict a process, a time evolution model of the process is required. Channel fading can be modeled using linear models, such as auto-regressive moving-average (ARMA) models. Such linear models are easy to use, and have low complexity. However, the fading process is highly nonlinear, and can not be exactly modeled with a reasonable linear filter. Therefore, for short-range applications, an approximate low-order auto-regressive (AR) model has been used to capture most of the fading dynamics. However, linear models do not perform well for long-range predictions, and exhibit poor performance for high mobility channels, as they are solely dependent on the correlation parameters of the fading process.

The use of deterministic sum-sinusoidal models to estimate channel fading has also been proposed. These models rely on complex estimations of amplitude, phase and Doppler shift frequencies. Thus, the shorter the estimation window, the higher the complexity, and the longer the estimation window, the higher the prediction errors. As a result, such models tend to be highly complex, or inaccurate.

It is, therefore, desirable to provide a low-complexity channel prediction system and method effective for long-range predictions.

SUMMARY OF THE INVENTION

In a first aspect, the present invention provides a method of predicting channel fading in a wireless network. The method comprises estimating channel model parameters from a channel estimate; recursively adapting the channel model parameters to predict channel fading coefficients, until a predetermined re-acquisition condition is satisfied; and then repeating the first two steps.

In a further aspect, the present invention provides a processor-readable medium containing statements and instructions, which, when executed, cause a processor to perform steps of estimating channel model parameters from a channel estimate; recursively adapting the channel model parameters to predict channel fading coefficients, until a predetermined re-acquisition condition is satisfied; and then repeating the first two steps.

Estimating the channel model parameters comprises estimating a Doppler frequency shift of each component of a current sampled signal, such as by applying a sum-sinusoidal model to the channel estimate and applying a fast Fourier transform to estimate the Doppler frequency shift of each signal component. The re-acquisition condition can, for example, be satisfied when an error trend in the predicted channel fading coefficients exceeds a predetermined threshold or when a predetermined time has elapsed. Recursively adapting the channel model parameters comprises estimating a state vector of the sum-sinusoidal model and applying a gradient-based adaptive approach, such as a least mean squares algorithm, to track the Doppler frequency shifts. Estimating the state vector comprises applying a Kalman filter, which can have a measurement matrix $M_n=[1, 1, \ldots, 1]$, and a state transition matrix $A_n=\text{diag}[e^{j\omega(1)Ts}, e^{j\omega(2)Ts}, \ldots, e^{j\omega(N)Ts}]$, where $\omega(n)$ is the Doppler frequency shift of each component, and Ts is the sampling period. The channel fading coefficients can be predicted as a function of the state vector.

In further aspects, the present invention provides a channel fading predictor for use in a wireless receiver and a wireless mobile communication device incorporating such a channel fading predictor. The channel fading predictor comprises a model acquisition unit to estimate Doppler frequency shifts for each component of a channel estimate; an adaptive filter to recursively track the Doppler frequency shifts; a Kalman filter to estimate a state vector of future channel fading coefficients based on the tracked Doppler frequency shifts and the channel estimate; a predictor to determine the future channel fading coefficient based on the state vector; and a re-acquisition detector which, when a predetermined re-acquisition condition has been satisfied, controls the model acquisition unit to re-estimate the Doppler frequency shifts based on a current channel estimate, and to provide the re-estimated Doppler frequency shifts to the adaptive filter. The channel fading predictor can further comprise a selector to selectively provide Doppler frequency shifts, from the model acquisition unit or from an output of the adaptive filter, to an input of the adaptive filter.

According to various embodiments, the model acquisition unit can apply a sum-sinusoidal model to estimate the Doppler frequency shift of each signal component. The re-acquisition detector can determine that the re-acquisition condition has been satisfied when an error trend in the predicted channel fading coefficients exceeds a predetermined threshold or when a predetermined time has elapsed. The adaptive filter can apply a gradient-based adaptive approach, such as a least mean squares algorithm, to track the Doppler frequency shifts. The Kalman filter can set a measurement matrix $M_n=[1, 1, \ldots, 1]$, and determine a state transition matrix $A_n=\text{diag}[e^{j\omega(1)Ts}, e^{j\omega(2)Ts}, \ldots, e^{j\omega(N)Ts}]$, where $\omega(n)$ is the Doppler frequency shift of each component, and Ts is the sampling period.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

The present invention provides a method and system for predicting channel fading, particularly in a mobile wireless environment. The method comprises estimating channel model parameters based on a channel estimate of a current sampled signal; and recursively adapting the model parameters to predict channel fading coefficients until a predetermined re-acquisition condition is satisfied. Once the re-acquisition condition has been satisfied, the model parameters are again estimated based on a current sampled signal. The model parameters are adaptively updated and used in a Kalman filter to provide a powerful fading prediction algorithm. The method has been found to be effective in performing long-range predictions and is of relatively low complexity.

Figure 1:
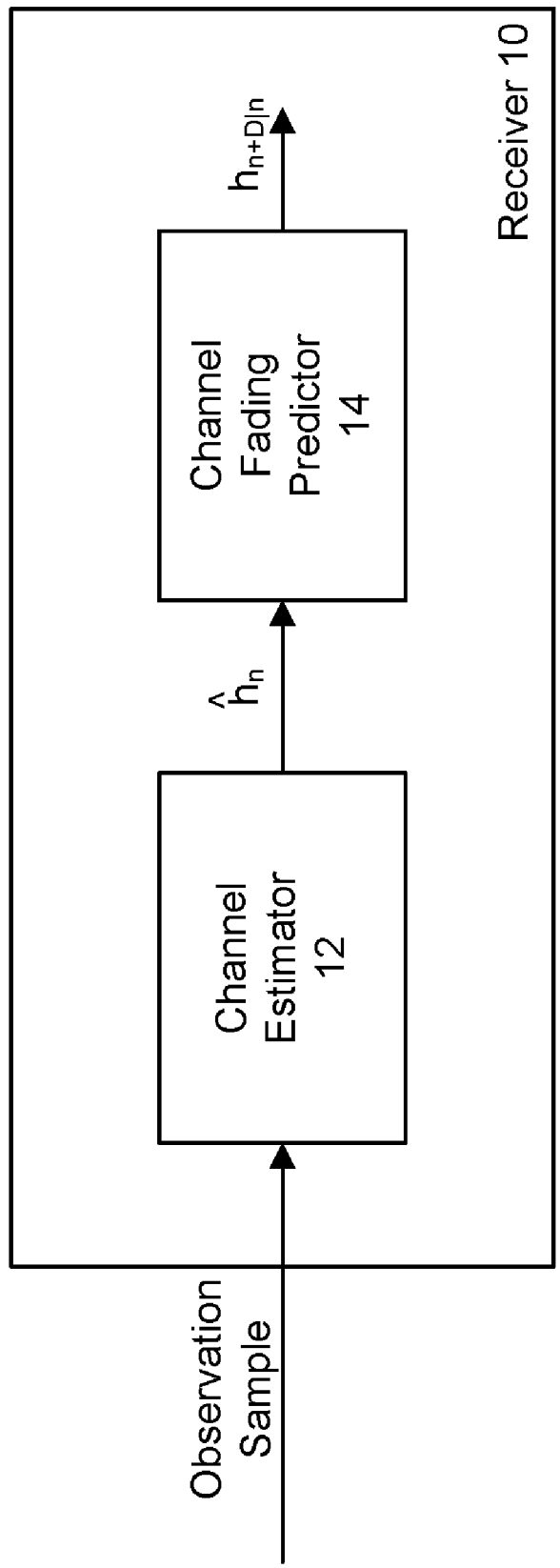
FIG. 1 is a block diagram of a receiver according to an embodiment.

Referring to FIG. 1, a receiver 10 according to an embodiment of the present invention is shown. The receiver 10 can be an element of a transceiver in a mobile communication device, such as a cellular telephone, personal digital assistant, or wireless-enabled laptop computer. The mobile communication device can be operating under commonly used protocols, such as those specified in IEEE 802.11, 802.15, 802.16, 802.20 and their variants, and according to any standard, including CDMA2000 1xRTT, W-CDMA (Wideband-CDMA), EDGE, CDMA EVDO, or GSM. A single path flat fading channel from a transmit antenna to a receive antenna is assumed. Under conditions where the path delay variations are not negligible in comparison to the symbol period, the same analysis can apply to each resolvable multipath component.

Only those elements of the receiver 10 that are necessary to the present invention are depicted. A channel estimator 12 estimates a channel estimate $\hat{h}_n$ using a sampled signal (observation sample), such as the available pilot signals, a training sequence, or other accepted channel estimation techniques. Channel estimation is well known in the art, and any suitable channel estimation technique can be used.

The channel estimate $\hat{h}_n$ is provided to a channel fading predictor 14 to predict a future channel fading coefficient $h_{n+D|n}$, at a prediction depth, or time increment, D. The future channel fading coefficient $h_{n+D|n}$ can then be used by the receiver 10, or provided to the transmitter (not shown), to improve performance of the system, as is well known in the art. The channel fading coefficient $h_n$ is zero mean, and has a variance of $\sigma_h^2 = 1$. The channel fading coefficient estimated by the channel fading predictor 14 can be shown as $\bar{h}_n = h_n + v_n$, where $\bar{h}_n$ is the estimate of the channel fading, and $v_n$ is the estimation error modeled as a zero mean Gaussian noise with variance $\sigma_v^2$. As an indicator of the estimation quality, the observation signal-to-noise ratio (SNR) is defined as $SNR_z = \sigma_h^2/\sigma_v^2 = 1/\sigma_v^2$.

Figure 2:
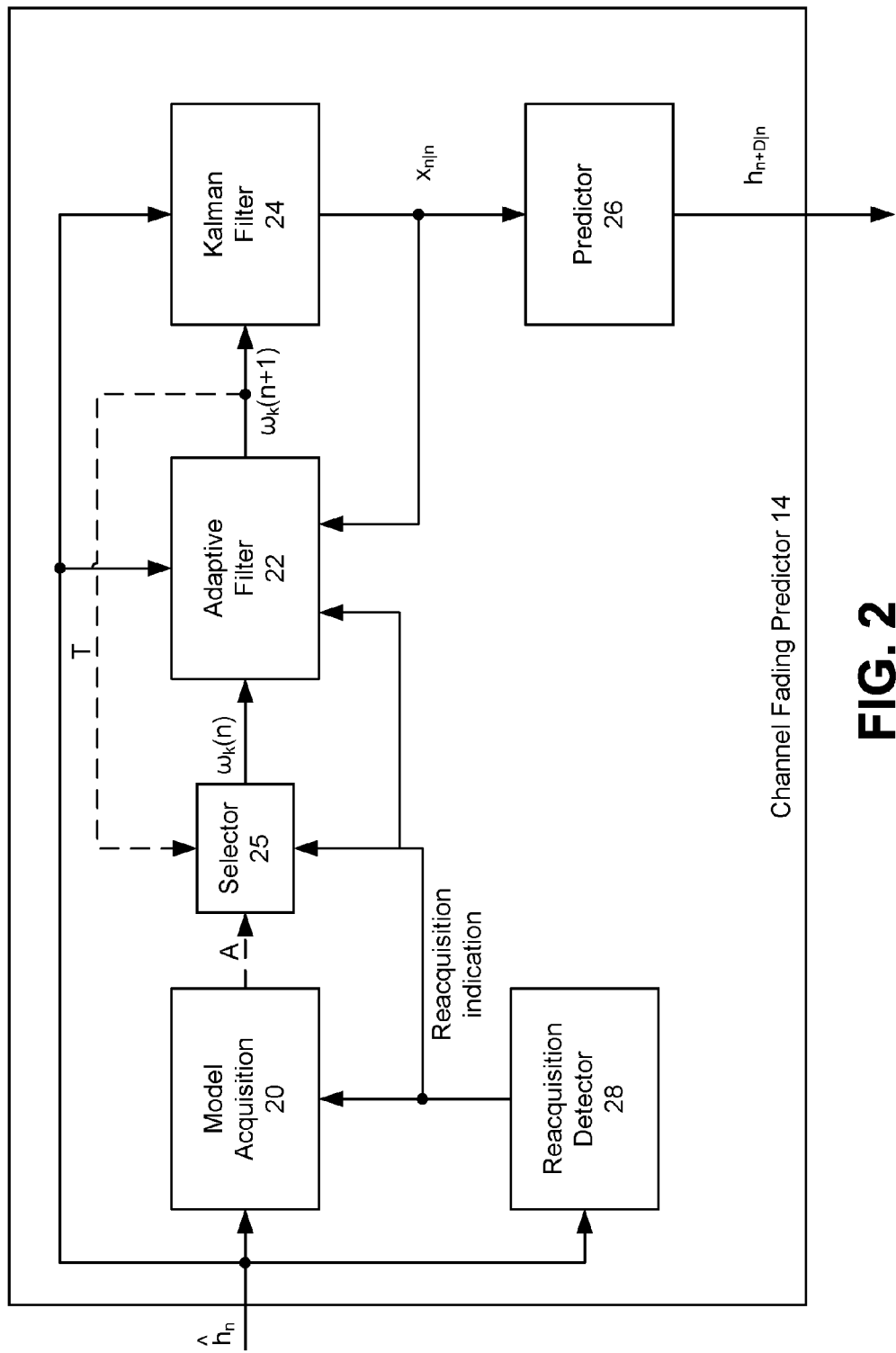
FIG. 2 is a block diagram of a channel fading predictor according to an embodiment.
Figure 3:
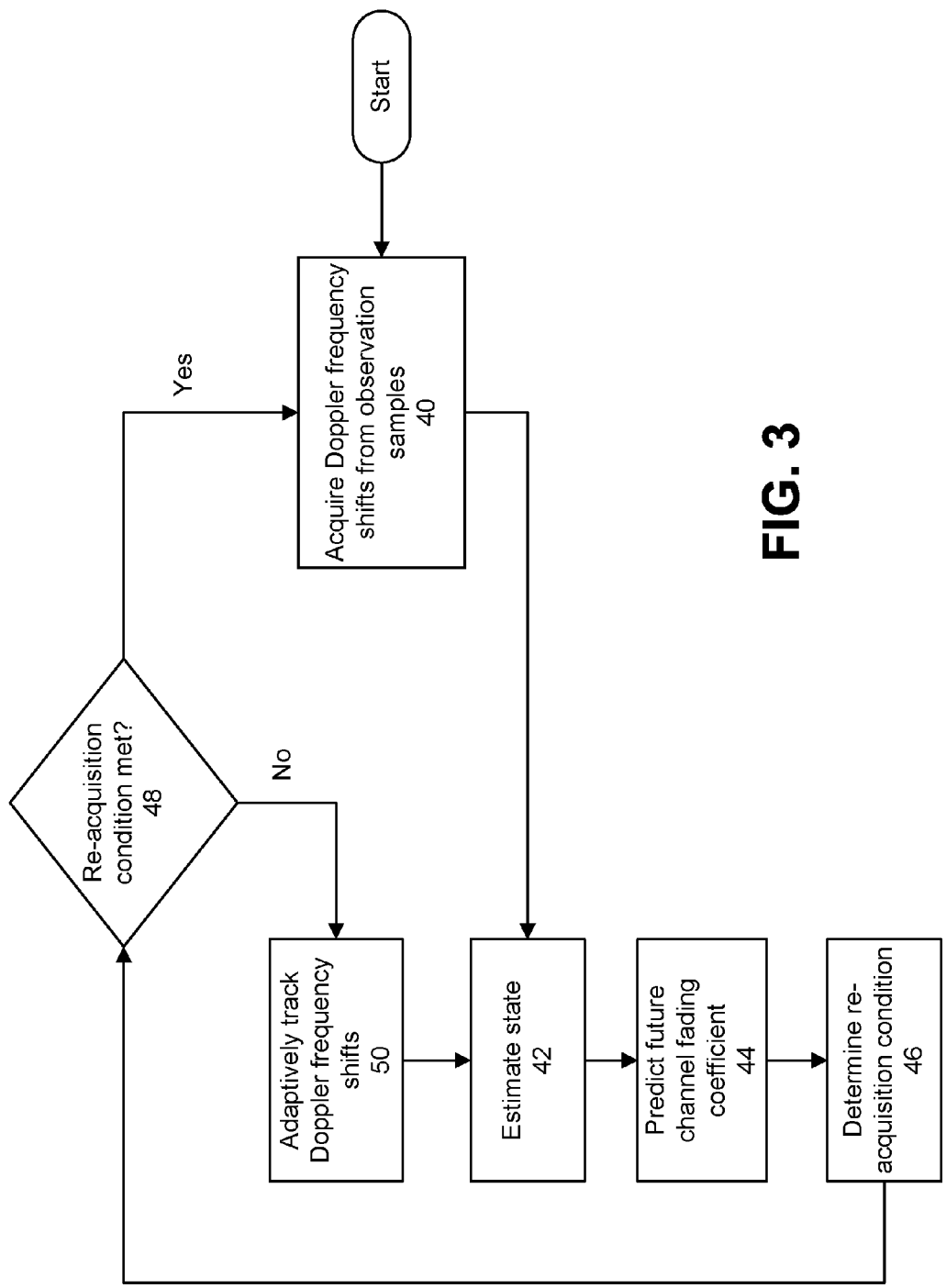
FIG. 3 is a flowchart of a method of channel fading prediction according to an embodiment.

Referring to FIGS. 2 and 3, the channel fading predictor 14 and its operation are shown in greater detail. In an embodiment, the channel fading predictor 14 comprises a model acquisition unit 20, a selector 25, an adaptive filter 22, a Kalman filter 24, a predictor 26, and a re-acquisition detector 28. A re-acquisition indication signal, provided by a re-acquisition detector 28, controls the model acquisition unit 20, selector 25 and adaptive filter 22.

In an initialization mode or a re-acquisition mode, the re-acquisition indication signal is set to an "acquire" value that activates the model acquisition unit 20 and holds the adaptive 22 filter in an inactive state (i.e. its input $\omega_k(n)$ equals its output $\omega_k(n+1)$). The channel estimate $\hat{h}_n$ is provided to the model acquisition unit 20, which determines the Doppler frequency shift $\omega_k$ of each scattered component of the estimated channel at time n (step 40). The selector 25 is activated to accept the Doppler frequency shifts $\omega_k$ from the model acquisition unit 22, as indicated by the path A, and to feed them to the adaptive filter 22. The adaptive filter is in its inactive state, and outputs $\omega_k(n+1) = \omega_k$. The Kalman filter 24 then determines a state vector $x_n$ (step 42), based on the outputs $\omega_k(n+1)$ of the adaptive filter 22 and the channel estimate $\hat{h}_n$. The Kalman filter 24 can also determine information concerning the amplitude $\alpha_k$ of the scattered components. As used herein, the Doppler frequency shifts $\omega_k$, the amplitudes $\alpha_k$, and the state vector $x_n$ are parameters of the model, and referred to, collectively or interchangeably, as model parameters.

When the channel fading predictor 14 is in its standard operational tracking mode, the re-acquisition indication signal is set to a "track" value that deactivates the model acquisition unit 20, activates the adaptive filter 22, and causes the selector 25 to set up a feedback loop between the input and output of the adaptive filter 22, as indicated by the return path T. The adaptive filter 22 estimates a future Doppler frequency shift $\omega_k(n+1)$ for each scattered component, by applying an adaptive tracking algorithm based on a previous Doppler frequency shift $\omega_k$ and a current state vector $x_n$. The previous Doppler frequency shift $\omega_k$ is input to the adaptive filter 22 by the feedback loop from the output of the adaptive filter 22. The state vector $x_n$ is determined by the Kalman filter 24 (step 42), which, as described above, can also determine information concerning the amplitude $\alpha_k$ of the scattered components.

In initialization, re-acquisition or tracking modes, the current state vector $x_n$ is provided to a predictor 26, which outputs the predicted future channel fading coefficient $h_{n+D|n}$ (step 44). The predicted future channel fading coefficient $h_{n+D|n}$ and the current observation sample $\hat{h}_n$ can then be processed by the re-acquisition detector 28 to determine a model re-acquisition condition (step 46), and to determine if the re-acquisition condition meets or exceeds a predetermined threshold (step 48). The re-acquisition condition can be, for example, a calculated error trend $E_{n+D}$ or an elapsed time since a previous acquisition. If the re-acquisition condition is not satisfied, the re-acquisition indication signal is set or held to the track value, and the selector 25 provides the previously estimated Doppler frequency shifts to the input of the adaptive filter 22. If re-acquisition is indicated, the re-acquisition indication signal is set to the acquire value, and the model acquisition unit 20 is activated to reacquire the channel fading model to provide a new estimate of the Doppler frequency shifts $\omega_k$.

Until such time as the maximum permissible error trend or other re-acquisition condition has been met, the adaptive filter 22 and Kalman filter 24 operate in the tracking mode as a recursive loop to continue estimating the future fading coefficients. Re-acquisition of the channel model parameters can be done frequently to keep the frequency Doppler estimates updated. However, to decrease the required computational overhead and complexity, consecutive acquisitions are preferably spaced as far as possible. This also permits other elements of the system to have sufficient time to catch up with the re-acquired frequency estimates. The operation of each element of the channel predictor 14 will now be described in greater detail.

The model acquisition unit 20 uses a sum-sinusoidal model to determine the Doppler frequency shift $\omega_k$ of each scattered component. Flat fading, i.e., one resolved multipath component, is assumed for the channel. But the same analysis can apply equally to each resolved multipath component where the delays are not negligible in comparison to the symbol period. When all delayed, or faded, components arrive at the receiver within a small fraction of the symbol duration, the fading channel is considered frequency-nonselective, or flat. Such flat fading commonly occurs in narrowband signaling. Jakes' model, also known as Clarke's model, is a special case of the sum-sinusoidal model described below, and is mathematically valid for a rich-scattering environment where the number of the scatterers is significant.

Jakes' fading model has been used for some time to simulate mobile channels. In an environment with no dominant line-of-sight between the transmitter and the receiver, it is well known that the envelope of a transmitted carrier at the receiver has a Rayleigh distribution, and a uniform phase. Assuming a two-dimensional isotropic scattering and an omni-directional receiving antenna, it is known that power spectral density (PSD) of the fading process is given by:

$$S_h(f) = \begin{cases} \dfrac{1}{\pi f_d} \dfrac{1}{\sqrt{1-\left(\dfrac{f}{f_d}\right)^2}} & |f| < f_d \\ 0, & \text{otherwise,} \end{cases} \quad (1.1)$$

where $f_d$ is the maximum Doppler frequency. The Doppler PSD of a fading channel describes how much spectral broadening it causes. This shows how a pure frequency, such as a pure sinusoid, which is an impulse in the frequency domain, is spread out across frequency when it passes through the channel. It is the Fourier transform of the autocorrelation function $R_h(\tau)$, which can be shown as:

$$R_h(t, t-\tau) = \frac{E[h(t)h*(t-\tau)]}{\sigma_h^2} = J_0(2\pi f_d \tau) \quad (1.2)$$

where $J_0(\cdot)$ is a zeroth order Bessel function of the first kind and $\tau$ is the time difference.

Jakes' fading results from a statistical modeling of fading. However, fading can be observed as a deterministic signal. Jakes' model for Rayleigh fading is based on summing sinusoids. When the receiver, the transmitter, and/or the scatterers are moving, each scattered component undergoes a Doppler frequency shift given approximately by:

$$f_k = f_d \cos(\theta_k) \quad (1.3)$$

where $\theta_k$ is the incident radiowave angle of the k'th component with respect to the motion of the mobile and $f_d$ is the maximum Doppler frequency defined as:

$$f_d = \frac{v}{c} f_c \quad (1.4)$$

where $f_c$ is the carrier frequency, $v$ is the mobile speed and c is the speed of light. Assuming $N_{sc}$ scatterers, the complex envelope of the flat fading signal at the receiver is:

$$h(t) = \sum_{k=1}^{N_{sc}} a_k e^{j(\omega_k t - \phi_k)} \quad (1.5)$$

where for the n'th scatterer, $\alpha_k$ is the (real) amplitude, $\phi_k$ is the initial phase, and $\omega_k = 2\pi f_k$ where $f_k$ is defined in (1.3). In real mobile environments, there are generally a few main scatterers that construct the fading signal.

Assuming $N_{sc}$ scatterers, there are $2N_{sc}$ unknown parameters to be determined for the model. Using $2N_{sc}$ fading samples, an equation set can be solved to find $\omega_k$ and $\alpha_k$, k=1, ..., $N_{sc}$, as detailed in A. Heidari, A. K. Khandani, and D. McAvoy, "Channel Prediction for 3G Communication Systems," tech. rep., Bell Mobility, August 2004, but it is evident that using noisy measurements can result in poor estimations. Looking at the problem in the frequency domain, a Fourier transform of the fading signal shown in (1.5) results in:

$$H(\omega) = \sum_{k=1}^{N_{sc}} a_k \delta(\omega - \omega_k) \quad (1.6)$$

Thus, the components are decoupled in the frequency domain and it is appropriate to find the parameters using a Fourier-based transform method, such as a Fast Fourier Transform (FFT) over an observation window (as described, for example in H. Hallen, S. Hu, A. Duel-Hallen, "Physical Models for Understanding and Testing Long Range Prediction of Multipath Fading in Wireless Communications," submitted to IEEE Transactions on Vehicular Technology), Root-MUSIC, ESPIRIT, or other suitable spectral estimation method. A FFT gives a good estimation of $\omega_k$ if the Doppler frequencies do not change drastically over the window, such as when a mobile device undergoes an abrupt path change.

In an embodiment, a Fourier transform, as described above, is used to estimate the $\omega(k)$, k=1, ..., $N_{sc}$ by performing FFT over an observation window of $N_{win}$ recent samples, H=FFT[h]. An FFT length of $N_{FFT}=2N_{win}$ can be used to increase the frequency resolution. Each sinusoid can be projected on up to 3 samples in H. Therefore, first the peak of H is found, and then the $\omega(1)$ is calculated by averaging over the amplitudes of the three adjacent frequency samples. At initialization, or re-acquisition, an initial estimate of $\alpha(1)$ is also achieved in this way. Other $\omega(k)$ and $\alpha(k)$ are found by continuing this procedure.

As can be seen in (1.6), the amplitude $\alpha_k$ can also be estimated from the Fourier analysis. However, $\alpha_k$ usually changes more quickly than $\omega_k$ as the mobile moves and the scattering environment changes. Therefore, knowing $\omega_k$, the Kalman filter 24 can be used instead to efficiently track $\alpha_k$.

The Kalman filter 24 is a recursive estimator. This means that only the estimated state from the previous time step and the current measurement are needed to compute the estimate for the current state. In contrast to batch estimation techniques, no history of observations and/or estimates is required.

An evolution model can be shown as a state-space model, as follows:

$$\begin{cases} x_n = A_n x_{n-1} + q_n \\ z_n = M_n x_n + v_n \end{cases} \quad (2.1)$$

where $x_n$ is a N×1 state vector at time n, $A_n$ is a N×N matrix which controls the transition of the state vector in time, and $q_n$ is a (usually Gaussian) noise vector, with a covariance of $Q=E[q_n q_n^H]$, which represents the model error. $M_n$ is known as the measurement matrix, and $v_n$ is the observation noise with the variance $\sigma_v^2$. In effect, $z_n$ is the system output which is the available (noisy) measurement of the state. In practice, $A_n$, Q and $M_n$ are generally constant or very slow time varying.

Assuming a state-space model, the Kalman filter 24 efficiently estimates the state vector $x_n$, which is used to track the Doppler frequencies and to predict the future samples of the fading signal. In an embodiment, applicable to the general fading model described above, the Kalman filter 24 can use the following state-space model:

$$A_n = \text{diag}[e^{j\omega(1)T_s}, e^{j\omega(2)T_s}, \ldots, e^{j\omega(N)T_s}] \quad (2.2)$$

and $$M_n = [1, 1, \ldots, 1] \quad (2.3)$$

where $z_n = \hat{h}_n$ is the available channel estimate, and the state vector is:

$$x_n = [\alpha(1)e^{jn\omega(1)T_s}, \alpha(2)e^{jn\omega(2)T_s}, \ldots, \alpha(N)e^{jn\omega(N)T_s}]^T \quad (2.4)$$

The state of the filter is represented by two variables: $x_n$, the estimate of the state at time n; and the error covariance matrix $P_n$, which is a measure of the estimated accuracy of the state estimate. The Kalman filter 24 has two distinct phases: predict and update. The predict phase uses the estimate from the previous time step to produce an estimate of the current state. In the update phase, measurement information from the current time step is used to refine this prediction to arrive at a new estimate.

In the predict phase:

$$x_n^- = A x_{n-1}^+ \quad (2.5)$$

$$P_n^- = A P_{n-1}^+ A^T + Q \quad (2.6)$$

While, in the update phase:

$$x_n^+ = x_n^- + K_n(z_n - M_n x_n^-) \quad (2.7)$$

$$P_n^+ = (I - K_n M_n) P_n^- \quad (2.8)$$

where $$K_n = P_n^- M_n^H (M_n P_n^- M_n^H + \sigma_v^2)^{-1} \quad (2.9)$$

where Q is the covariance matrix of the model noise; $z_n$ is the observation sample; $x_n^-$ is the a priori estimate of the state $x_n$ (also shown as $x_{n|n-1}$); $x_n^+$ is the a posteriori estimate of the state $x_n$, (i.e., having the observation $z_n$; also shown as $x_{n|n}$); $P_n^-$ is the covariance matrix of the a priori error; and $P_n^+$ is the covariance matrix of the a posteriori error.

Since $\omega_k$ generally changes slowly over time, the adaptive filter 22 can be used to track the Doppler frequencies. An adaptive algorithm is used to track the fine changes of the Doppler frequencies. Suitable tracking algorithms include Least Mean Squares (LMS) and Recursive Least Mean Squares (RLS) algorithms. In an embodiment, using a gradient-based approach, the following LMS algorithm can be applied:

$$\omega_{n+1}(k) = \omega_n(k) + \mu Im[X_n^+(k)^H M_n(k)^H e^n] \quad (3.1)$$

where $$e_n = z_n - \hat{h}_n \quad (3.2)$$

and where $$\hat{h}_n = M_n x_n^+ \quad (3.3)$$

Given the current state $x_n$, which carries all the information about the past, The predictor 26 can predict the future channel state. According to an embodiment, a Minimum Mean Squares Estimate (MMSE) of the D-step prediction can be given as:

$$\hat{x}_{n+D} = A^D x_n \quad (3.4)$$

Hence, the predicted future channel fading coefficient is $\hat{h}_{n+D} = M \hat{x}_{n+D}$.

The error trend E can be calculated by any suitable error smoothing method, such as exponential windowing and moving average methods. For example, given the predicted future channel coefficient $\hat{h}_{n+D}$, the re-acquisition detector 28 can use an exponential window for calculation of the error trend from known sample errors $e_n$, as follows:

$$E_{n+1} = \lambda_E E_n + (1 - \lambda_E) |e_n|^2 \quad (4.1)$$

where $\lambda_E$ is a forgetting factor chosen such that $0 \ll \lambda_E < 1$.

Figure 4:
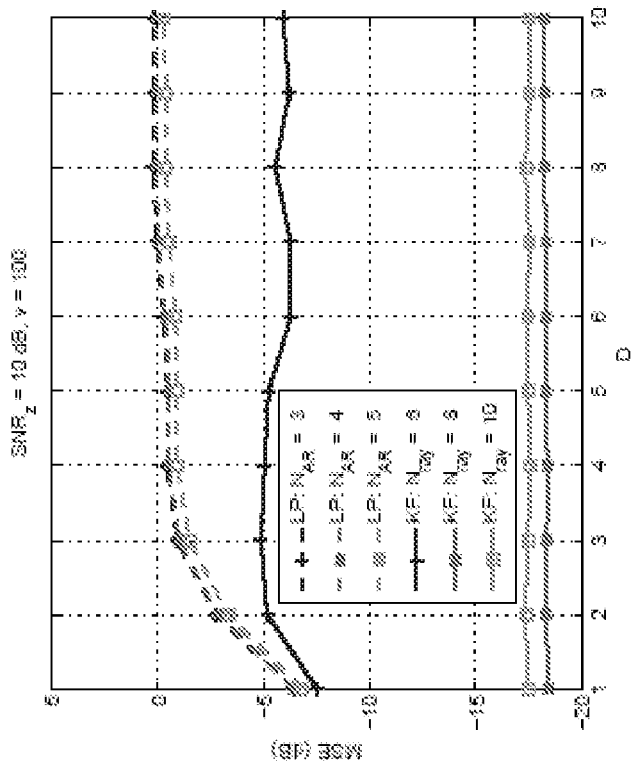
FIG. 4 is a comparison of simulation results for a channel fading predictor, according to an embodiment, and a linear predictor, in a Jakes' fading environment.
Figure 4:
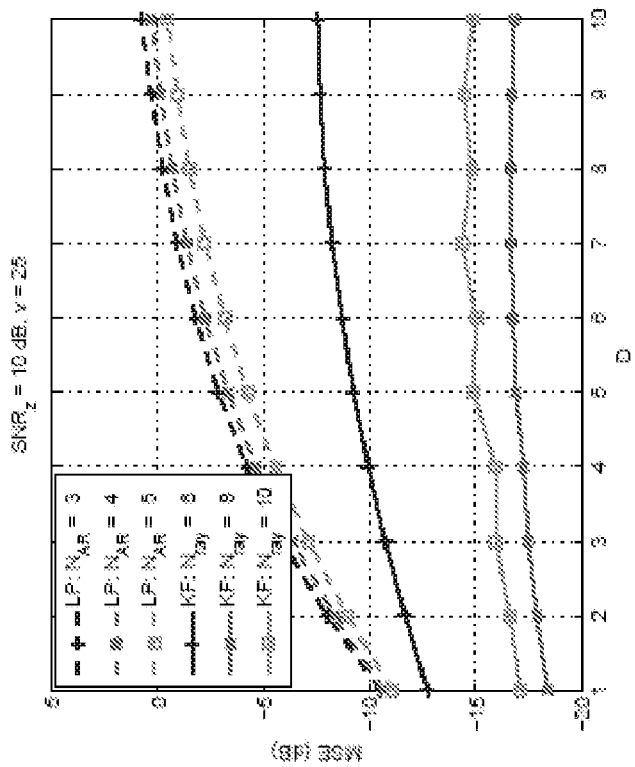
Figure 5:
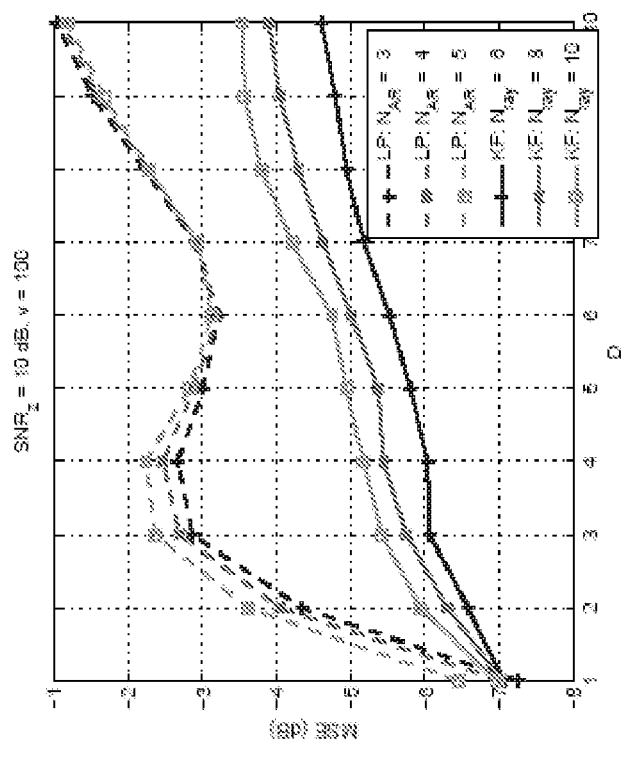
FIG. 5 is a comparison of simulation results for a channel fading predictor, according to an embodiment, and a linear predictor, in a non-stationary environment.
Figure 5:
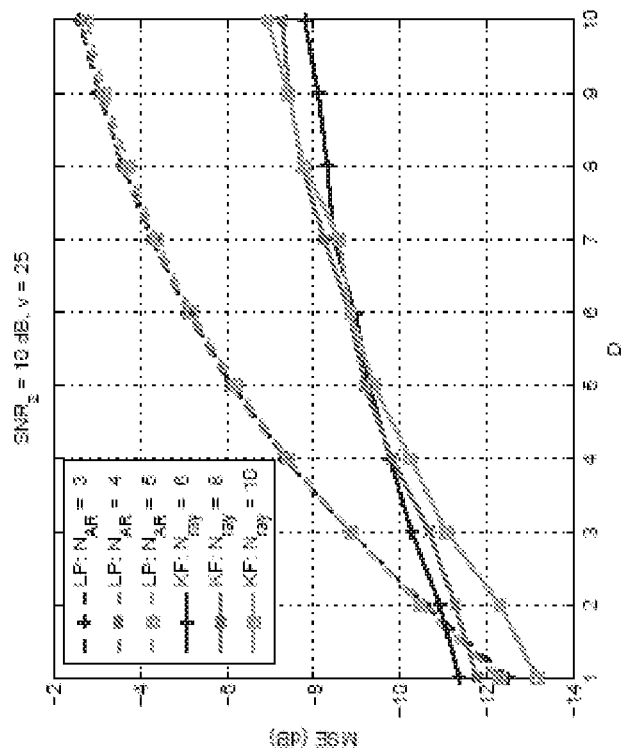

FIGS. 4 and 5 compare simulation results for channel fading prediction using the channel fading predictor (KF) of the present invention and a prior art linear predictor (LP). In practice, channel coefficients are estimated, using the conventional pilot signals or other means, which usually introduces some error in the available channel coefficients. The channel estimation error can be modeled as an Additive White Gaussian Noise (AWGN), and observation SNR, $SNR_z$, which is defined as the ratio of the channel power to the noise power. The MSE of the linear prediction versus mobile speed for different linear orders at different $SNR_z$ can be different. It is observed that at each $SNR_z$ and each mobile speed, there is an optimum order p, which could be different in other situations. This variable order makes the implementation of the prediction algorithm difficult. Therefore, for the $SNR_z$ corresponding to a specific application, an overall good order should be chosen. For example, consider $SNR_z = 40$ dB. For low to moderate mobile speeds, p=2 is optimum, while at high mobile speed, p=3 or 4 appears better.

For the simulations: carrier frequency $f_c = 2.15$ GHz; sampling frequency $f_s = 1500$ Hz; and $SNR_z = 10$ dB. The two prediction algorithms are compared with respect to the average mean square error (MSE) versus the prediction depth D. The results are reported for various linear orders $N_{AR}$, and various scattering orders $N_{ray}$, respectively ($N_{ray}$ is an estimate of $N_{sc}$ in (1.5)). FIG. 4 shows the results for Jakes' fading for the mobile speeds of V=25 kmph and V=100 kmph. It is observed that the present channel fading predictor significantly outperforms the linear predictor if $N_{ray}$ is large enough (here, for $N_{ray} \geq 8$), while the linear predictor fails at high prediction depths, regardless of the linear order.

Jakes' fading is a valid model for a rich scattering area. However, because Jakes' fading is stationary, it cannot accurately model the changes in the scattering environment. To test the present channel fading predictor vs. the linear predictor with a more realistic fading signal, a ray-tracing simulation environment, as described in A. Heidari, A. K. Khandani, and D. McAvoy, "Channel Prediction for 3G Communication Systems," tech. rep., Bell Mobility, August 2004, was used. The mobile device is assumed to be randomly moving vertically and horizontally in the scattering area and experiences different combinations of signal rays. At each point in the mobile path, it undergoes a different Doppler frequency shift and a different signal power for each ray. Therefore, the generated fading can closely resemble the fading in a real mobile environment.

FIG. 5 shows the results for ray-tracing fading for V=25 kmph and V=100 kmph. It is observed that the present channel fading predictor always outperforms the linear predictor. As ray-tracing fading does not represent a very rich scattering environment, it is observed that increasing $N_{ray}$ does not necessarily improve the performance. Note that the linear predictor is sensitive to the linear order at high mobile speeds. In fact, it is observed in the simulations that a linear model is not dependable for higher mobile speeds because the pattern of the performance fluctuation follows the correlation properties of the fading, i.e., a lower correlation results in a higher MSE. In conclusion, the simulations show that the present channel fading predictor performs very well in real mobile environments, and is significantly more efficient than the linear predictor.

In the preceding description, for purposes of explanation, numerous details are set forth in order to provide a thorough understanding of the embodiments of the invention. However, it will be apparent to one skilled in the art that these specific details are not required in order to practice the invention. In other instances, well-known electrical structures and circuits are shown in block diagram form in order not to obscure the invention. For example, specific details are not provided as to whether the embodiments of the invention described herein are implemented as a software routine, hardware circuit, firmware, or a combination thereof.

Embodiments of the invention can be represented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention can also be stored on the machine-readable medium. Software running from the machine-readable medium can interface with circuitry to perform the described tasks.

The above-described embodiments of the invention are intended to be examples only. Alterations, modifications and variations can be effected to the particular embodiments by those of skill in the art without departing from the scope of the invention, which is defined solely by the claims appended hereto.

The invention claimed is:

1. A method of predicting channel fading in a wireless network, comprising:
 (a) estimating channel model parameters from a channel estimate, including estimating a Doppler frequency shift of each component of a current sampled signal;
 (b) recursively adapting the channel model parameters to predict channel fading coefficients, by:
  recursively tracking the Doppler frequency shifts;
  estimating a state vector of future channel fading coefficients based on the tracked Doppler frequency shifts and the channel estimate; and
  determining the future channel fading coefficients based on the state vector, until a predetermined re-acquisition condition is satisfied; and then
 (c) repeating step (a) to re-estimate the Doppler frequency shifts based on a current channel estimate and step (b) based on the re-estimated Doppler frequency shifts.

2. The method of claim 1, wherein estimating the channel model parameters comprises applying a sum-sinusoidal model.

3. The method of claim 1, wherein estimating the channel model parameters comprises applying a fast Fourier transform to estimate a Doppler frequency shift of each signal component.

4. The method of claim 1, wherein the re-acquisition condition is satisfied when an error trend in the predicted channel fading coefficients exceeds a predetermined threshold.

5. The method of claim 1, wherein the re-acquisition condition is satisfied when a predetermined time has elapsed.

6. The method of claim 2, wherein recursively adapting the channel model parameters comprises estimating a state vector of the sum-sinusoidal model.

7. The method of claim 6, wherein recursively adapting the channel model parameters comprises applying a gradient-based adaptive approach to track the Doppler frequency shifts.

8. The method of claim 7, wherein applying the gradient-based adaptive approach comprises applying a least mean squares algorithm.

9. The method of claim 6, wherein estimating the state vector comprises applying a Kalman filter.

10. The method of claim 9, wherein applying the Kalman filter comprises setting a measurement matrix $M_n = [1, 1, \ldots, 1]$, and determining a state transition matrix $A_n = \text{diag}[e^{j\omega(1)T_s}, e^{j\omega(2)T_s}, \ldots, e^{j\omega(N)T_s}]$, where $\omega(n)$ is the Doppler frequency shift of each component, and $T_s$ is the sampling period.

11. The method of claim 6, further comprising predicting the channel fading coefficients.

12. The method of claim 11, wherein predicting the channel fading coefficients comprises predicting the channel fading coefficients as a function of the state vector.

13. A tangible processor-readable medium containing statements and instructions, which, when executed, cause a processor to perform steps of:
 (a) estimating channel model parameters from a channel estimate, including estimating a Doppler frequency shift of each component of a current sampled signal;
 (b) recursively adapting the channel model parameters to predict channel fading coefficients, by:
  recursively tracking the Doppler frequency shifts;
  estimating a state vector of future channel fading coefficients based on the tracked Doppler frequency shifts and the channel estimate;

determining the future channel fading coefficients based on the state vector; until a predetermined re-acquisition condition is satisfied; and then (c) repeating step (a) to re-estimate the Doppler frequency shifts based on a current channel estimate and step (b) based on the re-estimated Doppler frequency shifts.

14. A tangible processor-readable medium of claim 13, wherein estimating the channel model parameters comprises applying a sum-sinusoidal model.

15. A tangible processor-readable medium of claim 13, wherein estimating the channel model parameters comprises applying a fast Fourier transform to estimate a Doppler frequency shift of each signal component.

16. A tangible processor-readable medium of claim 13, wherein the re-acquisition condition is satisfied when an error trend in the predicted channel fading coefficients exceeds a predetermined threshold.

17. A tangible processor-readable medium of claim 13, wherein the re-acquisition condition is satisfied when a predetermined time has elapsed.

18. A tangible processor-readable medium of claim 14, wherein recursively adapting the channel model parameters comprises estimating a state vector of the sum-sinusoidal model.

19. A tangible processor-readable medium of claim 18, wherein recursively adapting the channel model parameters comprises applying a gradient-based adaptive approach to track the Doppler frequency shifts.

20. A tangible processor-readable medium of claim 19, wherein applying the gradient-based adaptive approach comprises applying a least mean squares algorithm.

21. A tangible processor-readable medium of claim 18, wherein estimating the state vector comprises applying a Kalman filter.

22. A tangible processor-readable medium of claim 21, wherein applying the Kalman filter comprises setting a measurement matrix $M_n=[1, 1, \ldots, 1]$, and determining a state transition matrix $A_n=\mathrm{diag}[e^{j\omega(1)Ts}, e^{j\omega(2)Ts}, \ldots, e^{j\omega(N)Ts}]$ where $\omega(n)$ is the Doppler frequency shift of each component, and Ts is the sampling period.

23. A tangible processor-readable medium of claim 19, further comprising predicting the channel fading coefficients.

24. A tangible processor-readable medium of claim 23, wherein predicting the channel fading coefficients comprises predicting the channel fading coefficients as a function of the state vector.

25. A channel fading predictor for use in a wireless receiver, the channel fading predictor comprising:
a tangible processor-readable medium storing instructions, which, when executed by a processor, cause the processor to provide:
a model acquisition unit to estimate Doppler frequency shifts for each component of a channel estimate;
an adaptive filter to recursively track the Doppler frequency shifts;
a Kalman filter to estimate a state vector of future channel fading coefficients based on the tracked Doppler frequency shifts and the channel estimate;
a predictor to determine the future channel fading coefficient based on the state vector; and
a re-acquisition detector which, when a predetermined re-acquisition condition has been satisfied, controls the model acquisition unit to re-estimate the Doppler frequency shifts based on a current channel estimate, and to provide the re-estimated Doppler frequency shifts to the adaptive filter.

26. The channel fading predictor of claim 25, further comprising a selector to selectively provide Doppler frequency shifts, from the model acquisition unit or from an output of the adaptive filter, to an input of the adaptive filter.

27. The channel fading predictor of claim 25, wherein the model acquisition unit applies a sum-sinusoidal model.

28. The channel fading predictor of claim 25, wherein the model acquisition unit applies a fast Fourier transform to estimate the Doppler frequency shift of each signal component.

29. The channel fading predictor of claim 25, wherein the re-acquisition detector determines that the re-acquisition condition has been satisfied when an error trend in the predicted channel fading coefficients exceeds a predetermined threshold.

30. The channel fading predictor of claim 25, wherein the re-acquisition detector determines that the re-acquisition condition has been satisfied when a predetermined time has elapsed.

31. The channel fading predictor of claim 25, wherein the adaptive filter applies a gradient-based adaptive approach to track the Doppler frequency shifts.

32. The channel fading predictor of claim 31, wherein the gradient-based adaptive approach comprises a least mean squares algorithm.

33. The channel fading predictor of claim 25, wherein the Kalman filter sets a measurement matrix $M_n=[1, 1\ldots, 1]$, and determines a state transition matrix $A_n=\mathrm{diag}[e^{j\omega(1)Ts}, e^{j\omega(2)Ts}, \ldots, e^{j\omega(N)Ts}]$, where $\omega(n)$ is the Doppler frequency shift of each component, and Ts is the sampling period.

34. A wireless mobile communication device comprising:
a receiver having a channel fading predictor to predict channel fading coefficients, the channel fading predictor comprising:
a tangible processor-readable medium storing instructions, which, when executed by a processor, cause the processor to provide:
a model acquisition unit to estimate Doppler frequency shifts for each component of a channel estimate;
an adaptive filter to recursively track the Doppler frequency shifts;
a Kalman filter to estimate a state vector of future channel fading coefficients based on the tracked Doppler frequency shifts and the channel estimate;
a predictor to determine the future channel fading coefficient based on the state vector; and
a re-acquisition detector which, when a predetermined re-acquisition condition has been satisfied, controls the model acquisition unit to re-estimate the Doppler frequency shifts based on a current channel estimate, and to provide the re-estimated Doppler frequency shifts to the adaptive filter.

35. The wireless mobile communication device of claim 34, further comprising a selector to selectively provide Doppler frequency shifts, from the model acquisition unit or from an output of the adaptive filter, to an input of the adaptive-filter.

36. The wireless mobile communication device of claim 34, wherein the model acquisition unit applies a sum-sinusoidal model.

37. The wireless mobile communication device of claim 34, wherein the model acquisition unit applies a fast Fourier transform to estimate the Doppler frequency shift of each signal component.

38. The wireless mobile communication device of claim 34, wherein the re-acquisition detector determines that the re-acquisition condition has been satisfied when an error trend in the predicted channel fading coefficients exceeds a predetermined threshold.

39. The wireless mobile communication device of claim 34, wherein the re-acquisition detector determines that the re-acquisition condition has been satisfied when a predetermined time has elapsed.

40. The wireless mobile communication device of claim 34, wherein the adaptive filter applies a gradient-based adaptive approach to track the Doppler frequency shifts.

41. The wireless mobile communication device of claim 40, wherein the gradient-based adaptive approach comprises a least mean squares algorithm.

42. The wireless mobile communication device of claim 34, wherein the Kalman filter sets a measurement matrix $M_n=[1, 1, \ldots, 1]$, and determines a state transition matrix $A_n=\text{diag}[e^{j\omega(1)Ts}, e^{j\omega(2)Ts}, \ldots, e^{j\omega(N)Ts}]$, where $\omega(n)$ is the Doppler frequency shift of each component, and Ts is the sampling period.

* * * * *

UNITED STATES PATENT AND TRADEMARK OFFICE
CERTIFICATE OF CORRECTION

PATENT NO. : 8,233,570 B2
APPLICATION NO. : 11/694474
DATED : July 31, 2012
INVENTOR(S) : Abdorreza Heidari et al.

It is certified that error appears in the above-identified patent and that said Letters Patent is hereby corrected as shown below:

Title page, item (56), References Cited, insert therefor -- US-2006/0072682, 04/2006 Kent et al --

Column 5, Line 60, delete

" $R_h(t, t-\tau) = \frac{E[h(t)h*(t-\tau)]}{\sigma_h^2} = J_0(2\pi f_d \tau)$ "

and insert therefor

-- $R_h(t, t-\tau) = \frac{E[h(t)h*(t-\tau)]}{\sigma_h^2} = J_0(2\pi f_d \tau)$ --

Column 11, Claim 23, Line 42, delete "claim 19" and insert therefor -- claim 18 --

Signed and Sealed this
Twelfth Day of March, 2013

Teresa Stanek Rea
*Acting Director of the United States Patent and Trademark Office*